US012304197B2

(12) United States Patent
Hirama

(10) Patent No.: US 12,304,197 B2
(45) Date of Patent: May 20, 2025

(54) THERMAL PRINTER

(71) Applicant: Seiko Instruments Inc., Chiba (JP)

(72) Inventor: Toshihiro Hirama, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 47 days.

(21) Appl. No.: 18/494,538

(22) Filed: Oct. 25, 2023

(65) Prior Publication Data

US 2024/0140112 A1 May 2, 2024

(30) Foreign Application Priority Data

Nov. 2, 2022 (JP) ................................ 2022-175949

(51) Int. Cl.
*B41J 11/04* (2006.01)
*B41J 2/32* (2006.01)
(Continued)

(52) U.S. Cl.
CPC ................ *B41J 11/04* (2013.01); *B41J 2/32* (2013.01); *B41J 15/04* (2013.01); *B41J 29/13* (2013.01)

(58) Field of Classification Search
CPC ..... B41J 2/32; B41J 15/04; B41J 29/13; B41J 11/02; B41J 11/053; B41J 11/057;
(Continued)

(56) References Cited

U.S. PATENT DOCUMENTS 9,365,056 B2 * 6/2016 Kim .................... B41J 11/0045
2008/0068437 A1 3/2008 Hirai
(Continued)

FOREIGN PATENT DOCUMENTS

EP 4249276 A1 9/2023
JP 2022-080715 A 5/2022

OTHER PUBLICATIONS

Extended European Search Report in Europe Application No. 23207082.1, dated Mar. 12, 2024, 6 pages.

*Primary Examiner* — Kristal Feggins
(74) *Attorney, Agent, or Firm* — Crowell & Moring LLP

(57) ABSTRACT

A thermal printer includes: a housing including a roll sheet receiving portion; a cover which is pivotably attached to the housing, and is configured to open and close the roll sheet receiving portion; a platen roller which is rotatably supported on the cover via a bearing portion; and a thermal head which is to be brought into press contact with an outer peripheral surface of the platen roller. The cover includes a cover main body and a base member which is fixed to the cover main body. Directions orthogonal to an axial direction of the platen roller and also orthogonal to each other are defined as a first direction and a second direction, respectively. The cover main body includes a first holding portion which supports the bearing portion from one side in the first direction. The base member includes a second holding portion which supports the bearing portion from the other side in the first direction. The first holding portion is located on one side in a second direction with respect to the bearing portion, and includes a first claw portion protruding to the other side in the first direction along an outer peripheral surface of the bearing portion. The second holding portion is located on the one side in the second direction with respect to the bearing portion, and includes a second claw portion protruding to the one side in the first direction along the outer peripheral surface of the bearing portion. The first claw portion and the second claw portion face each other in the first direction.

6 Claims, 5 Drawing Sheets

(51) Int. Cl.
*B41J 15/04* (2006.01)
*B41J 29/13* (2006.01)

(58) Field of Classification Search
CPC ... B41J 11/06; B41J 11/08; B41J 11/10; B41J 11/13
See application file for complete search history.

(56) References Cited

U.S. PATENT DOCUMENTS

2010/0020154 A1* 1/2010 Takahashi .................. B41J 2/32 347/220
2016/0052304 A1* 2/2016 Obara ........................ B41J 2/32 347/220

* cited by examiner

THERMAL PRINTER

RELATED APPLICATIONS

This application claims priority to Japanese Patent application No. JP2022-175949, filed on Nov. 2, 2022, the entire content of which is incorporated herein by reference.

BACKGROUND OF THE INVENTION

1. Field of the Invention

The present invention relates to a thermal printer.

2. Description of the Related Art

Hitherto, there has been known a thermal printer as a printer that performs printing on a heat-sensitive sheet. The thermal printer, for example, enables reduction in size and weight of a printing unit, and has a simple configuration owing to non-use of toner, ink, or the like. Thus, the thermal printer has been adopted for, for example, a portable terminal device, and widely used for printing a variety of labels, receipts, tickets, and the like. Such a thermal printer includes: a platen roller that is rotatably supported on a housing; and a thermal head that is to be brought into press contact with an outer peripheral surface of the platen roller (for example, Japanese Patent Application Laid-open No. 2022-080715). The thermal printer is configured to perform printing by heating a printing surface of a recording sheet with heating elements of the thermal head to develop a color on the printing surface while feeding the recording sheet through rotation of the platen roller under a state in which the recording sheet is nipped between the platen roller and the thermal head.

The thermal printer for portable use is assumed to fall due to, for example, carelessness of a user. In the related-art thermal printer, a holding portion opened into a C-shape is provided on the housing side, and the holding portion is elastically deformed so that a bearing portion of the platen roller is arranged inside the holding portion and supported on the housing. Thus, when the related-art thermal printer falls with the opening of the holding portion facing downward, there is a possibility that the platen roller may be detached from a cover due to impact of the falling.

The present invention has been made in consideration of such a circumstance, and one of objects thereof is to provide a thermal printer that can suppress detachment of a platen roller even against impact from any direction.

SUMMARY OF THE INVENTION

According to one embodiment of the present invention, there is provided a thermal printer including: a housing including a roll sheet receiving portion; a cover which is pivotably attached to the housing, and is configured to open and close the roll sheet receiving portion; a platen roller which is rotatably supported on the cover via a bearing portion; and a thermal head which is to be brought into press contact with an outer peripheral surface of the platen roller, wherein the cover includes a cover main body and a base member which is fixed to the cover main body, wherein directions orthogonal to an axial direction of the platen roller and also orthogonal to each other are defined as a first direction and a second direction, respectively, wherein the cover main body includes a first holding portion which supports the bearing portion from one side in the first direction, wherein the base member includes a second holding portion which supports the bearing portion from the other side in the first direction, wherein the first holding portion is located on one side in a second direction with respect to the bearing portion, and includes a first claw portion protruding to the other side in the first direction along an outer peripheral surface of the bearing portion, wherein the second holding portion is located on the one side in the second direction with respect to the bearing portion, and includes a second claw portion protruding to the one side in the first direction along the outer peripheral surface of the bearing portion, and wherein the first claw portion and the second claw portion face each other in the first direction.

In the above-mentioned thermal printer according to the one embodiment of the present invention, wherein the first claw portion and the second claw portion each have a width dimension which is reduced in going toward a tip end side of each of the first claw portion and the second claw portion, wherein the first claw portion includes a first inclined surface which is inclined to one side in the axial direction in going toward the tip end side of the first claw portion, wherein the second claw portion includes a second inclined surface which is inclined to the other side in the axial direction in going toward the tip end side of the second claw portion, and wherein the first inclined surface and the second inclined surface face each other in the axial direction and the first direction.

In the above-mentioned thermal printer according to the one embodiment of the present invention, wherein a sheet discharge port is provided between the housing and the cover, and wherein the first inclined surface and the second inclined surface are each inclined toward an end portion side of the platen roller in going away from the sheet discharge port.

In the above-mentioned thermal printer according to the one embodiment of the present invention, wherein a chamfered surface is provided at a tip end of each of the first claw portion and the second claw portion.

In the above-mentioned thermal printer according to the one embodiment of the present invention, wherein a protruding length of each of the first claw portion and the second claw portion is equal to or longer than a radius of the outer peripheral surface of the bearing portion.

In the above-mentioned thermal printer according to the one embodiment of the present invention, wherein a holding hole portion is provided in the base member, and extends through the base member in the axial direction, wherein the platen roller includes: a first end portion which is supported by the first holding portion and the second holding portion; and a second end portion which is located on a side opposite to the first end portion in the axial direction, and wherein the platen roller is supported on an inner peripheral surface of the holding hole portion via a bearing portion at the second end portion.

DETAILED DESCRIPTION OF THE PREFERRED EMBODIMENTS

<Thermal Printer>

A thermal printer according to an embodiment of the present invention is described below based on the drawings.

Figure 1:
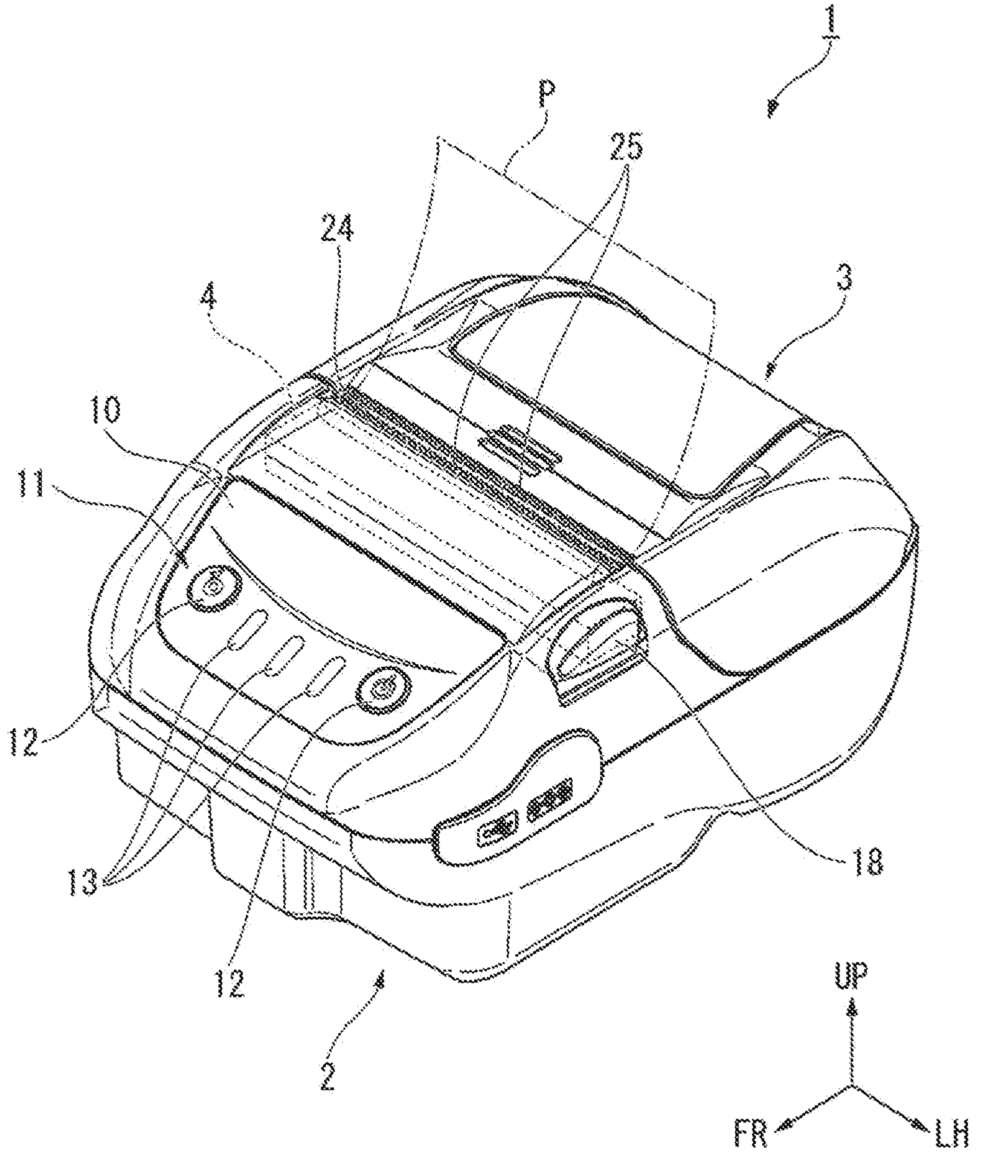
FIG. 1 is a perspective view of a thermal printer according to an embodiment of the present invention, under a state in which a cover is closed.
Figure 2:
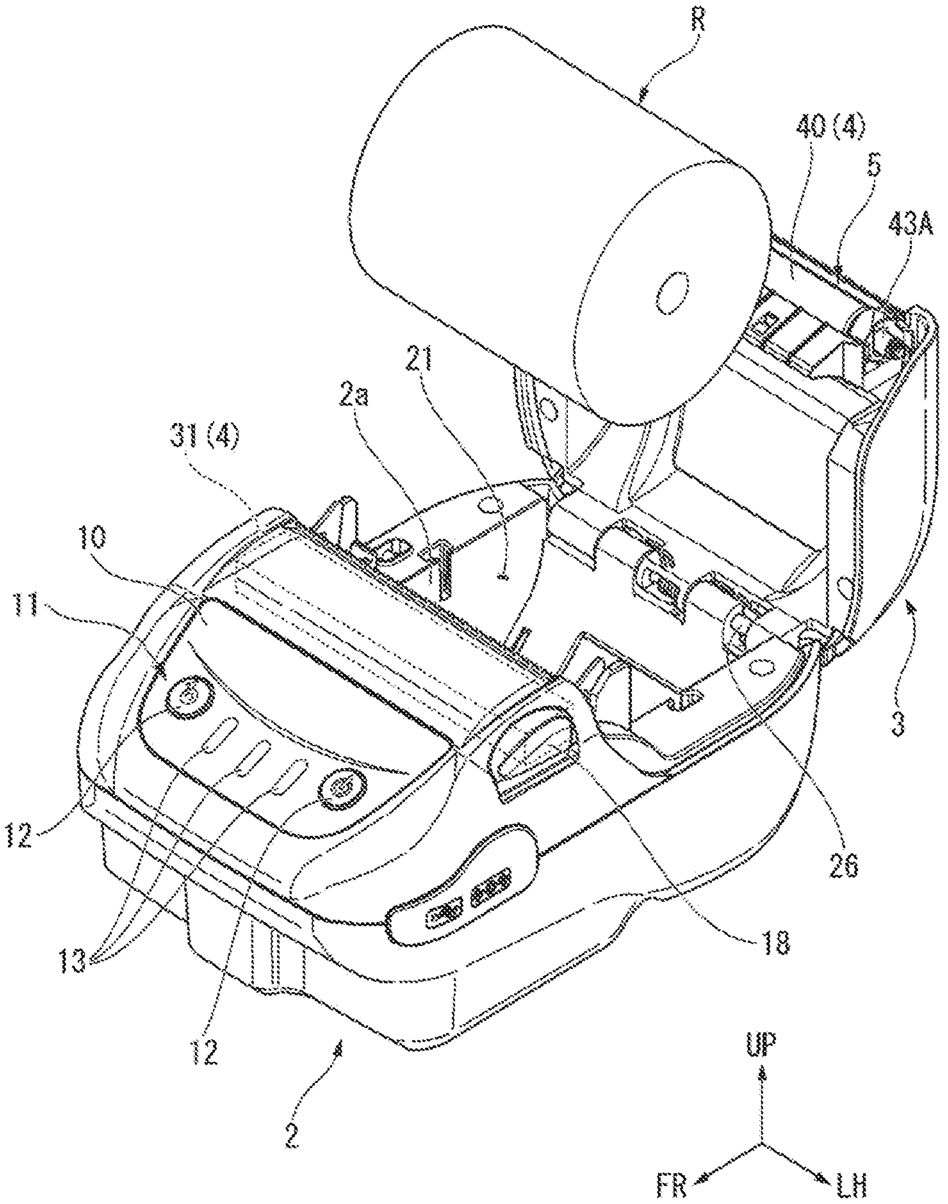
FIG. 2 is a perspective view of the thermal printer according to the embodiment of the present invention, under a state in which the cover is opened.

FIG. 1 is a perspective view for illustrating a thermal printer 1 under a state in which a cover 3 is closed, and FIG. 2 is a perspective view for illustrating the thermal printer 1 under a state in which the cover 3 is opened.

In the following description, in order to facilitate understanding of the invention, illustration is simplified by, for example, appropriately omitting a part of components, simplifying shapes, and changing scales. Further, in FIG. 1 and FIG. 2, FR denotes a front side, LH denotes a left side, and UP denotes an upper side.

As illustrated in FIG. 1 and FIG. 2, the thermal printer 1 mainly includes: a housing 2 including an opening portion 2*a* (see FIG. 2); the cover 3 that is pivotably supported on the housing 2, and opens and closes the opening portion 2*a* of the housing 2; and a printing unit 4 that is mounted on the housing 2 and the cover 3.

The housing 2 is mainly made of a resin material such as polycarbonate. A front portion of the housing 2 is formed into a rectangular parallelepiped shape having an upper surface portion 10. Meanwhile, a rear portion of the housing 2 is formed into a box shape having the opening portion 2*a* opened upward. An operation unit 11 that performs a variety of operations of the thermal printer 1 is arranged in the upper surface portion 10 of the housing 2. The operation unit 11 is provided with a variety of function switches 12, such as a power switch and a FEED switch; and a variety of lamps 13, such as a POWER lamp and an ERROR lamp, the POWER lamp being arranged adjacent to the function switch 12 and notifying ON and OFF information on the power switch, the ERROR lamp notifying, for example, an error of the thermal printer 1. Further, an open button 18 for the cover 3 is provided between the upper surface portion 10 and a side wall of the housing 2.

A roll sheet receiving portion 21 into which a roll sheet R is to be received through the opening portion 2*a* is defined in the rear portion of the housing 2. That is, the housing 2 includes the roll sheet receiving portion 21. A recording sheet P used in this embodiment is a heat-sensitive sheet, and is suitably used for, for example, printing a variety of labels, receipts, and tickets. The recording sheet P is wound into a roll shape to form the roll sheet R. The printing unit 4 performs printing on a portion of the recording sheet P, which is drawn out from the roll sheet R.

The cover 3 covers the roll sheet receiving portion 21 from above. A rear end of the cover 3 is pivotably supported on the housing 2 via a hinge shaft 26 (see FIG. 2). A front end of the cover 3 is configured to be lockable to the housing 2. When a user presses the open button 18 of the housing 2, locking between the housing 2 and the cover 3 is released. Accordingly, the cover 3 is turned from a closing position (see FIG. 1) to an opening position (see FIG. 2). Further, in the closing position of the cover 3, a gap defined between a front edge of the cover 3 and a rear edge of the upper surface portion 10 of the housing 2 serves as a sheet discharge port 24 (see FIG. 1) from which the printed recording sheet P is to be discharged. That is, the sheet discharge port 24 is provided between the housing 2 and the cover 3.

Cutting blades 25 for cutting the recording sheet P discharged from the sheet discharge port 24 are provided at an opening edge of the sheet discharge port 24. The cutting blades 25 are respectively formed integrally with the rear edge (portion of the opening edge, which is located on the front side) of the upper surface portion 10 of the housing 2; and the front edge of the cover 3, and the recording sheet P is cut by being pulled down toward each of the cutting blades 25.

<Printing Unit>

The printing unit 4 includes: a thermal head 31 provided at a rear end portion of the upper surface portion 10 of the housing 2; and a platen roller 40 that is provided at a front end portion of the cover 3, and is to be attachably and detachably combined with the thermal head 31 in accordance with an opening and closing operation of the cover 3. Under a state in which the cover 3 is closed, the platen roller 40 faces the thermal head 31 in a fore-and-aft direction, and is pressed against the thermal head 31. The platen roller 40 is configured to be rotatable so as to feed the recording sheet P while pressing a printing surface of the recording sheet P against the thermal head 31. The recording sheet P passes between the thermal head 31 and the platen roller 40.

The thermal head 31 performs printing by heating the recording sheet P passing between the thermal head 31 and the platen roller 40. The thermal head 31 has a rectangular shape with its longitudinal direction defined as a right-and-left direction in plan view when viewed in the fore-and-aft direction, and is arranged so that a rear surface of the thermal head 31 faces an inside of the roll sheet receiving portion 21 inside the housing 2. On a head surface of the thermal head 31, a large number of heating elements are arrayed in the right-and-left direction. The head surface is a surface opposed to the printing surface of the recording sheet P, and the recording sheet P may be nipped between the head surface and an outer peripheral surface of the platen roller 40. The heating elements of the thermal head 31 are each controlled to generate heat, based on a signal from a control unit (not shown), and the control of the heat generation of the heating elements enables printing, for example, various kinds of letters and figures on the printing surface of the recording sheet P.

<Holding Structure for Platen Roller>

Figure 3:
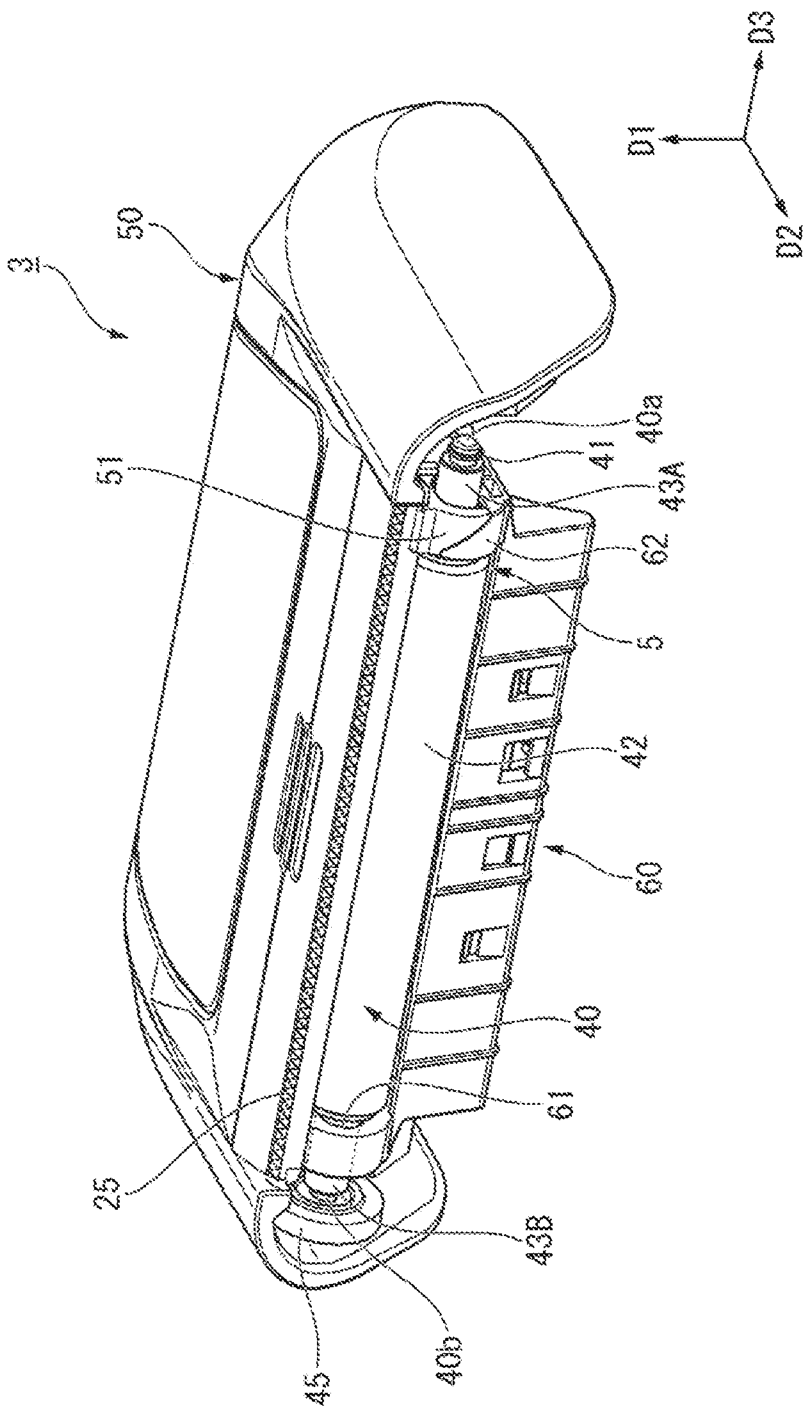
FIG. 3 is a perspective view of the cover and a platen roller in the embodiment of the present invention.
Figure 4:
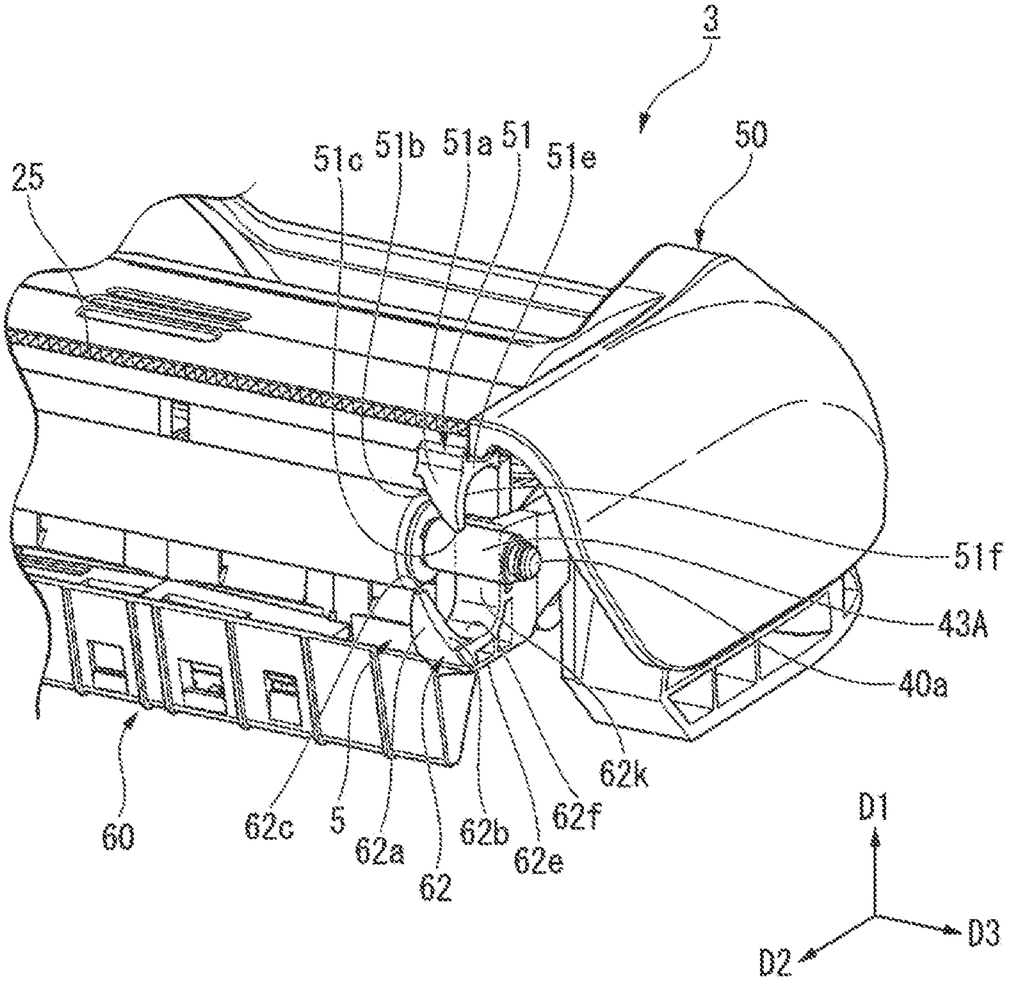
FIG. 4 is an exploded perspective view of the cover and the platen roller in the embodiment of the present invention.
Figure 5:
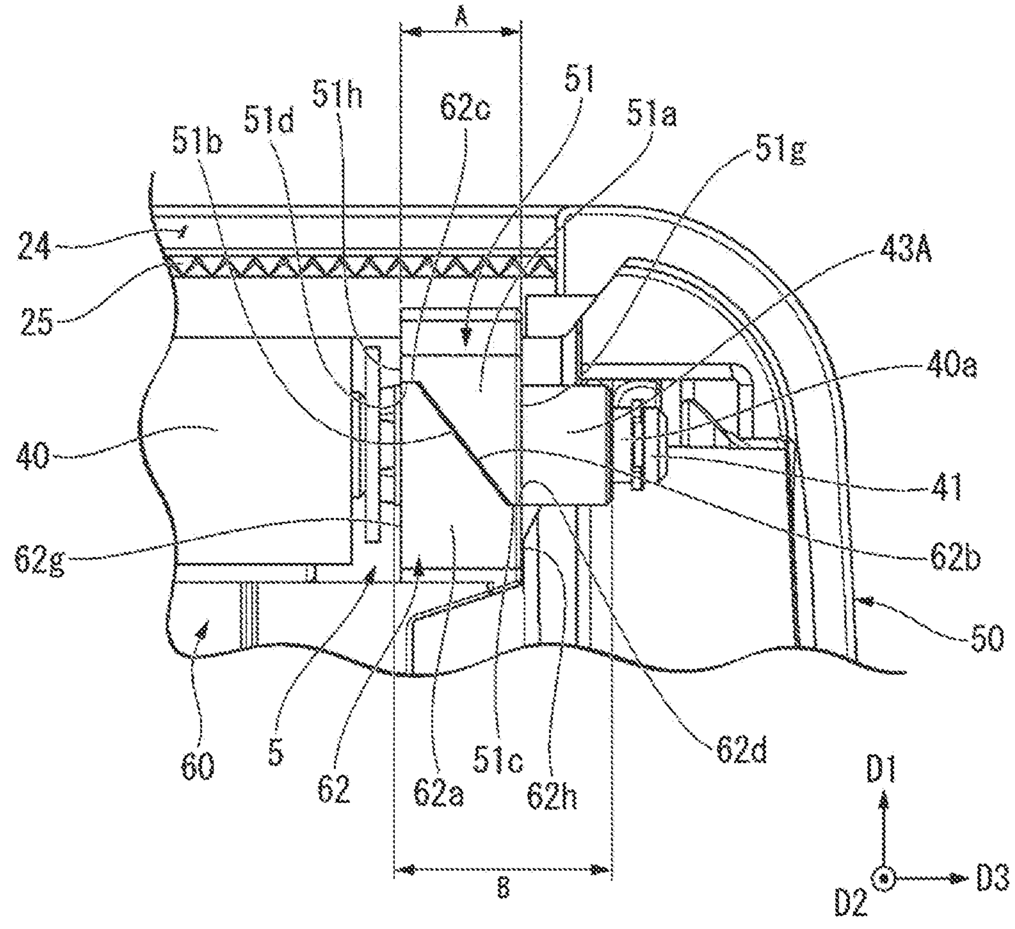
FIG. 5 is a front view of a holding structure for holding the platen roller in the cover in the embodiment of the present invention.

FIG. 3 is a perspective view of the cover 3 and the platen roller 40. FIG. 4 is an exploded perspective view of the cover 3 and the platen roller 40. FIG. 5 is a front view of a holding structure 5 of the cover 3, which is for holding the platen roller 40.

In FIG. 3 to FIG. 5, there is illustrated a coordinate system indicating a first direction D1, a second direction D2, and an axial direction D3. The axial direction D3 refers to an axial direction of the platen roller 40, and matches with a right-and-left direction of the thermal printer 1. The first direction D1 and the second direction D2 are directions orthogonal to the axial direction D3 and also orthogonal to each other. The first direction D1 matches with an up-and-down direction of the thermal printer 1 under a state in which the cover 3 is closed. The second direction D2 matches with a fore-and-aft direction of the thermal printer 1 under the state in which the cover 3 is closed.

One side in the first direction (+D1 side) corresponds to an upper side of the thermal printer 1, and the other side in the first direction (−D1 side), which is a side opposite thereto, corresponds to a lower side of the thermal printer 1. One side in the second direction (+D2 side) corresponds to a front side of thermal printer 1, and the other side in the second direction (−D2 side), which is a side opposite thereto, corresponds to a rear side of the thermal printer 1. Further, one side in the axial direction (+D3 side) corresponds to a left side of the thermal printer 1, and the other side in the axial direction (−D3 side), which is a side opposite thereto, corresponds to a right side of the thermal printer 1.

As illustrated in FIG. 3, a right-and-left direction of the platen roller 40 is defined as the axial direction thereof. The platen roller 40 includes: a platen shaft 41 extending in the axial direction D3; and a roller main body 42 made of, for example, rubber, and externally mounted on the platen shaft 41. Further, the platen roller 40 includes: a first end portion 40*a* that is an end portion on the one side in the axial direction (+D3 side); and a second end portion 40*b* that is an end portion on the other side in the axial direction (−D3 side).

Bearing portions 43A and 43B are respectively mounted on the first end portion 40*a* and the second end portion 40*b* of the platen roller 40. The bearing portions 43A and 43B hold an outer peripheral surface of the platen shaft 41 from a radially outer side. The bearing portions 43A and 43B in this embodiment are sliding bearings. The bearing portions 43A and 43B are held on the cover 3. The platen roller 40 is rotatably supported on the cover 3 via the bearing portions 43A and 43B.

In the following description, in a case of distinguishing the pair of bearing portions 43A and 43B from each other, one of the pair of bearing portions 43A and 43B, which is mounted on the first end portion 40*a* of the platen roller 40, is referred to as "first bearing portion 43A," and the other thereof, which is mounted on the second end portion 40*b* of the platen roller 40, is referred to as "second bearing portion 43B."

Further, a platen gear 45 is fixed to the platen roller 40. The platen gear 45 is mounted on the outer peripheral surface of the platen shaft 41 and on the other side in the axial direction (−D3 side) of the second bearing portion 43B at the second end portion 40*b* of the platen roller 40. The platen gear 45 meshes with a gear driven by a driving device (not shown), under a state in which the cover 3 is closed, and thus is driven by the driving device. The platen roller 40 is rotated together with the platen gear 45.

The cover 3 includes a cover main body 50 and a base member 60. The cover main body 50 has a plate shape. The cover main body 50 forms an outer side surface of the cover 3. Meanwhile, the base member 60 forms an inner side surface of the cover 3. The base member 60 is fixed to the cover main body 50 so as to reinforce the cover main body 50. The base member 60 holds the hinge shaft 26 (see FIG. 2) serving as a center of turning of the cover 3. As illustrated in FIG. 4, the base member 60 is located on the other side in the first direction (−D1 side) of the cover main body 50. The base member 60 is assembled to the cover main body 50 from the other side in the first direction (−D1 side).

As illustrated in FIG. 3, a holding hole portion 61 is provided in the base member 60, and extends through the base member 60 in the axial direction. The holding hole portion 61 is located in a vicinity of an end portion of the cover 3 on the other side in the axial direction (−D3 side). An inner diameter of the holding hole portion 61 is substantially equal to an outer diameter of the second bearing portion 43B. The second bearing portion 43B is inserted into the holding hole portion 61. The second end portion 40*b* of the platen roller 40 is supported on an inner peripheral surface of the holding hole portion 61 via the second bearing portion 43B.

The cover 3 includes the holding structure 5 for holding the first bearing portion 43A of the platen roller 40. The holding structure 5 is located in a vicinity of an end portion of the cover 3 on the one side in the axial direction (+D3 side). The holding structure 5 includes a first holding portion 51 of the cover main body 50 and a second holding portion 62 of the base member 60. That is, the cover main body 50 includes the first holding portion 51, and the base member 60 includes the second holding portion 62. The first holding portion 51 supports the first bearing portion 43A from the one side in the first direction (+D1 side). Meanwhile, the second holding portion 62 supports the first bearing portion 43A from the other side in the first direction (−D1 side).

As illustrated in FIG. 4, the first holding portion 51 includes: an upper support portion 51*e* located on the one side in the first direction (+D1 side) with respect to the first bearing portion 43A; and a first claw portion 51*a* located on the one side in the second direction (+D2 side) with respect to the first bearing portion 43A. The upper support portion 51*e* and the first claw portion 51*a* are connected to each other so as to form an L-shape when viewed from the axial direction D3.

A surface of the upper support portion 51*e* on the other side in the first direction (−D1 side) and a surface of the first claw portion 51*a* on the other side in the second direction (−D2 side) are smoothly connected to each other to form a first holding surface 51*f* having an arc shape around a center axis of the platen roller 40. The first holding surface 51*f* faces or is brought into contact with an outer peripheral surface of the first bearing portion 43A. The first holding portion 51 restricts movement of the first bearing portion 43A to the one side in the first direction (+D1 side) and the one side in the second direction (+D2 side).

The second holding portion 62 includes: a lower support portion 62*e* located on the other side in the first direction (−D1 side) with respect to the first bearing portion 43A; a second claw portion 62*a* located on the one side in the second direction (+D2 side) with respect to the first bearing portion 43A; and a rear support portion 62*k* located on the other side in the second direction (−D2 side) with respect to the first bearing portion 43A. The lower support portion 62*e*, the second claw portion 62*a*, and the rear support portion 62*k* are connected to one another so as to form a U-shape when viewed from the axial direction D3.

A surface of the lower support portion 62*e* on the one side in the first direction (+D1 side), a surface of the second claw portion 62*a* on the other side in the second direction (−D2 side), and a surface of the rear support portion 62*k* on the one side in the second direction (+D2 side) are smoothly connected to one another to form a second holding surface 62*f* having an arc shape around the center axis of the platen roller 40. The second holding surface 62*f* faces or is brought into contact with the outer peripheral surface of the first bearing portion 43A. The second holding portion 62 restricts movement of the first bearing portion 43A to the other side in the first direction (−D1 side), the one side in the second direction (+D2 side), and the other side in the second direction (−D2 side).

The first holding surface 51*f* and the second holding surface 62*f* form an inner peripheral surface of a hole portion having a substantially circular shape when viewed from the axial direction D3. That is, the holding structure 5 includes the hole portion surrounding the first bearing portion 43A from a radially outer side. The hole portion is arranged coaxially with the holding hole portion 61 (see FIG. 3). An area of the first holding surface 51*f*, which is formed on a rear surface of the first claw portion 51*a*, and an area of the second holding surface 62*f*, which is formed on a rear surface of the second claw portion 62*a*, are arranged side by side in the axial direction D3. The holding structure 5 restricts, by the two areas, movement of the first bearing portion 43A to the one side in the second direction (+D2 side).

As illustrated in FIG. 5, the first claw portion 51*a* protrudes to the other side in the first direction (−D1 side) along the outer peripheral surface of the first bearing portion 43A. Meanwhile, the second claw portion 62*a* protrudes to the one side in the first direction (+D1 side) along the outer peripheral surface of the first bearing portion 43A. The second claw portion 62*a* is located on the other side in the axial direction (−D3 side) with respect to the first claw portion 51*a*. That is, the first claw portion 51*a* and the second claw portion 62*a* are arranged side by side in the axial direction D3.

The first claw portion 51*a* and the second claw portion 62*a* each have a width dimension which is reduced in going toward a tip end side of each of the first claw portion 51*a* and the second claw portion 62*a*. In order to enhance reliability of holding the first bearing portion 43A, it is preferred that a protruding length of each of the first claw portion 51*a* and the second claw portion 62*a* be equal to or longer than a radius of the outer peripheral surface of the first bearing portion 43A. Further, for the purpose of space saving, it is preferred that the protruding length of each of the first claw portion 51*a* and the second claw portion 62*a* be equal to or shorter than a diameter of the outer peripheral surface of the first bearing portion 43A.

Herein, the tip end of the "first claw portion 51*a*" corresponds to an end portion of the first claw portion 51*a* on the other side in the first direction (−D1 side), and a "root of the first claw portion 51*a*" corresponds to an end portion of the first claw portion 51*a* on the one side in the first direction (+D1 side). Similarly, the "tip end of the second claw portion 62*a*" corresponds to an end portion of the second claw portion 62*a* on the one side in the first direction (+D1 side), and a "root of the second claw portion 62*a*" corresponds to an end portion of the second claw portion 62*a* on the other side in the first direction (−D1 side). Further, herein, the width dimension of the first claw portion 51*a* or the second claw portion 62*a* refers to a dimension of the first claw portion 51*a* or the second claw portion 62*a* in the axial direction D3, respectively. In addition, herein, the protruding length of the first claw portion 51*a* or the second claw portion 62*a* refers to a dimension of the first claw portion 51*a* or the second claw portion 62*a* in the first direction D1, respectively.

As illustrated in FIG. 5, the first claw portion 51*a* includes a first side surface 51*g*, a second side surface 51*h*, a first step surface 51*d*, a first inclined surface 51*b*, and a first chamfered surface 51*c*.

The first side surface 51*g* is a surface facing the one side in the axial direction (+D3 side). The second side surface 51*h* is a surface facing the other side in the axial direction (−D3 side). A distance between the first side surface 51*g* and the second side surface 51*h* is a width dimension A of the root of the first claw portion 51*a*.

The first step surface 51*d* is a surface facing the other side in the first direction (−D1 side). The first step surface 51*d* is continuous to the second side surface 51*h*.

The first inclined surface 51*b* is a surface facing the other side in the first direction (−D1 side) and the other side in the axial direction (−D3 side). The first inclined surface 51*b* is continuous to the first step surface 51*d*. The first inclined surface 51*b* is inclined to the one side in the axial direction (+D3 side) in going toward the tip end side. A distance between the first inclined surface 51*b* and the first side surface 51*g* in the axial direction D3 is gradually reduced in going toward the tip end side.

The first chamfered surface 51*c* is provided at the tip end of the first claw portion 51*a*. The first chamfered surface 51*c* is a surface facing the other side in the first direction (−D1 side). The first chamfered surface 51*c* is continuous to the first inclined surface 51*b* and the first side surface 51*g*. The chamfered surface as described herein is a surface provided at the tip end in order to avoid formation of an acute corner portion between two surfaces continuous to each other at the tip end. The first chamfered surface 51*c* prevents an acute corner portion from being formed due to the first inclined surface 51*b* and the first side surface 51*g* directly intersecting with each other.

The second claw portion 62*a* has a configuration substantially similar to that of the first claw portion 51*a*. That is, the second claw portion 62*a* includes a third side surface 62*g*, a fourth side surface 62*h*, a second step surface 62*d*, a second inclined surface 62*b*, and a second chamfered surface 62*c*.

The third side surface 62*g* is a surface facing the other side in the axial direction (−D3 side). The third side surface 62*g* is arranged substantially on the same plane as the second side surface 51*h*. The fourth side surface 62*h* is a surface facing the one side in the axial direction (+D3 side). The fourth side surface 62*h* is arranged substantially on the same plane as the first side surface 51*g*. A distance between the third side surface 62*g* and the fourth side surface 62*h* is a width dimension A of the root of the second claw portion 62*a*. In this embodiment, the width dimension A of the root of the second claw portion 62*a* is substantially equal to the width dimension A of the root of the first claw portion 51*a*. For the purpose of securing rigidity and strength of the first claw portion 51*a* and the second claw portion 62*a*, it is preferred that the width dimension A of the root of each of the first claw portion 51*a* and the second claw portion 62*a* be 50% or more of a dimension B of the first bearing portion 43A in the axial direction.

The second step surface 62*d* is a surface facing the one side in the first direction (+D1 side). The second step surface 62*d* is continuous to the fourth side surface 62*h*.

The second inclined surface 62*b* is a surface facing the one side in the first direction (+D1 side) and the one side in the axial direction (+D3 side). The second inclined surface 62*b* is continuous to the second step surface 62*d*. The second inclined surface 62*b* is inclined to the other side in the axial direction (−D3 side) in going toward the tip end side. A distance between the second inclined surface 62*b* and the third side surface 62*g* in the axial direction D3 is gradually reduced in going toward the tip end side.

The second chamfered surface 62*c* is provided at the tip end of the second claw portion 62*a*. The second chamfered surface 62*c* is a surface facing the one side in the first direction (+D1 side). The second chamfered surface 62*c* is continuous to the second inclined surface 62*b* and the third side surface 62*g*. The second chamfered surface 62*c* prevents an acute corner portion from being formed due to the second inclined surface 62*b* and the third side surface 62*g* directly intersecting with each other.

The first claw portion 51*a* and the second claw portion 62*a* face each other in the first direction D1. More specifically, the first chamfered surface 51*c* and the second step surface 62*d* face each other in the first direction D1. The first step surface 51*d* and the second chamfered surface 62*c* face each other in the first direction D1. The first inclined surface 51*b* and the second inclined surface 62*b* face each other in the first direction D1, and further face each other also in the axial direction D3.

It is preferred that the respective surfaces of the first claw portion 51*a* and the second claw portion 62*a* face each other with a slight gap therebetween. Due to a gap being provided between the first claw portion 51*a* and the second claw portion 62*a*, tolerances of forming accuracy and assembling accuracy of the cover main body 50 and the base member 60 can be absorbed by the gap. Further, due to the first claw portion 51*a* and the second claw portion 62*a* being separated from each other, the first claw portion 51*a* and the second claw portion 62*a* are prevented from receiving forces from each other, and hence, the cover main body 50 and the base member 60 can be each suppressed from being deformed due to reception of a force.

In this embodiment, the sheet discharge port 24 is provided in a vicinity of the holding structure 5 for the first bearing portion 43A. The sheet discharge port 24 may serve as an intrusion path through which liquid such as water intrudes into the housing 2. In this embodiment, the first inclined surface 51*b* and the second inclined surface 62*b* are inclined toward the first end portion 40*a* side of the platen roller 40 in going away from the sheet discharge port 24. Accordingly, liquid having intruded from the sheet discharge port 24 flows in a direction separating from the roll sheet R along front surfaces of the first inclined surface 51*b* and the second inclined surface 62*b*.

<Conclusion>

In the cover 3 in this embodiment, the cover main body 50 includes the first holding portion 51 supporting the first bearing portion 43A from the one side in the first direction (+D1 side), and the base member 60 includes the second holding portion 62 supporting the first bearing portion 43A from the other side in the first direction (−D1 side). The first holding portion 51 is located on the one side in the second direction (+D2 side) with respect to the first bearing portion 43A, and includes the first claw portion 51*a* protruding to the other side in the first direction (−D1 side) along the outer peripheral surface of the first bearing portion 43A. Further, the second holding portion 62 is located on the one side in the second direction (+D2 side) with respect to the first bearing portion 43A, and includes the second claw portion 62*a* protruding to the one side in the first direction (+D1 side) along the outer peripheral surface of the first bearing portion 43A. The first claw portion 51*a* and the second claw portion 62*a* face each other in the first direction D1.

According to this embodiment, the first bearing portion 43A for the platen roller 40 can be held and supported from both sides in the first direction D1 orthogonal to the axial direction by the first holding portion 51 of the cover main body 50 and the second holding portion 62 of the base member 60. Further, the first holding portion 51 and the second holding portion 62 includes the first claw portion 51*a* and the second claw portion 62*a*, respectively, on the one side in the second direction (+D2 side) of the first bearing portion 43A. Thus, even in a direction orthogonal to a direction in which the first holding portion 51 and the second holding portion 62 hold the first bearing portion 43A therebetween, an opening is hardly formed in a part holding the first bearing portion 43A. Accordingly, it is possible to suppress detachment of the platen roller 40 from the cover 3 even against impact from any direction.

According to this embodiment, both the first claw portion 51*a* and the second claw portion 62*a* are located on the one side in the second direction (+D2 side) with respect to the platen roller 40, and restrict movement of the platen roller 40 to the one side in the second direction (+D2 side). Thus, even in a case in which one of the first claw portion 51*a* or the second claw portion 62*a* is damaged, the other thereof can restrict the movement of the platen roller 40 to the one side in the second direction (+D2 side), and hence, reliability of holding the platen roller 40 by the cover 3 can be enhanced.

According to this embodiment, the cover 3 can be easily assembled by holding the first bearing portion 43A between the cover main body 50 and the base member 60, and then performing assembling thereof in the first direction. That is, according to this embodiment, an assembling process of the thermal printer 1 can be simplified.

In this embodiment, the width dimension of each of the first claw portion 51*a* and the second claw portion 62*a* is reduced in going toward the tip end side. The first claw portion 51*a* includes the first inclined surface 51*b* that is inclined to the one side in the axial direction (+D3 side) in going toward the tip end side. Meanwhile, the second claw portion 62*a* includes the second inclined surface 62*b* that is inclined to the other side in the axial direction (−D3 side) in going toward the tip end side. The first inclined surface 51*b* and the second inclined surface 62*b* face each other in the axial direction D3 and the first direction D1.

According to this embodiment, the first claw portion 51*a* and the second claw portion 62*a* each have the largest width dimension at the root. At the time of, for example, falling of the thermal printer 1, the first claw portion 51*a* and the second claw portion 62*a* each receive the largest force at the root from the first bearing portion 43A. According to this embodiment, in each of the first claw portion 51*a* and the second claw portion 62*a*, the width dimension of the root is set larger than that on the tip end side, and thus, the first claw portion 51*a* and the second claw portion 62*a* can be suppressed from being damaged due to impact at the time of the falling.

According to this embodiment, the first claw portion 51*a* and the second claw portion 62*a* each taper in going toward the tip end side, and are arranged so that the respective inclined surfaces (the first inclined surface 51*b* and the second inclined surface 62*b*) face each other in the axial direction D3 and the first direction D1. Thus, the first claw portion 51*a* and the second claw portion 62*a* can be arranged side by side in the axial direction D3 without increase in size of the holding structure 5 in the axial direction. As a result, even when the first claw portion 51*a* and the second claw portion 62*a* each receive impact at the time of the falling, and thus are each deformed in a direction widening a gap therebetween, such a gap as to correspond to an outer diameter of the first bearing portion 43A is hardly generated. Consequently, the platen roller 40 can be suppressed from being detached from between the first holding portion 51 and the second holding portion 62 due to impact at the time of the falling.

In this embodiment, the sheet discharge port 24 is provided between the housing 2 and the cover 3. In this embodiment, the first inclined surface 51*b* and the second inclined surface 62*b* are each inclined toward the first end portion 40*a* side of the platen roller 40 in going away from the sheet discharge port 24.

According to this embodiment, in a case in which liquid such as rainwater intrudes into the housing 2 from the sheet discharge port 24, the liquid flowing along the first inclined surface 51*b* and the second inclined surface 62*b* can be guided in a direction separating from the roll sheet R in the axial direction D3. Accordingly, the roll sheet R can be suppressed from becoming wet due to the liquid.

In this embodiment, the chamfered surfaces 51*c* and 62*c* are provided at the tip ends of the first claw portion 51*a* and the second claw portion 62*a*, respectively.

According to this embodiment, the tip end of each of the first claw portion 51*a* and the second claw portion 62*a* has no sharpened shape, and hence, the first claw portion 51*a* and the second claw portion 62*a* are hardly damaged. Further, in a case in which the cover main body 50 and the base member 60 are each made of a resin material, a lifetime of a mold for the tip end of each of the first claw portion 51*a* and the second claw portion 62*a* can be extended.

In this embodiment, the protruding length of each of the first claw portion 51*a* and the second claw portion 62*a* is equal to or longer than the radius of the outer peripheral surface of the first bearing portion 43A.

With this configuration, even when, due to impact at the time of the falling, the first claw portion 51*a* and the second claw portion 62*a* are each deformed in a direction in which the first claw portion 51*a* and the second claw portion 62*a* are each opened to the one side in the second direction (+D2 side), as long as an amount of the deformation of each of the first claw portion 51*a* and the second claw portion 62*a* falls within a range equal to or smaller than the radius of the outer peripheral surface of the first bearing portion 43A, the platen roller 40 can be suppressed from being detached from the holding structure 5. It is preferred that the protruding length of each of the first claw portion 51*a* and the second claw portion 62*a* be equal to or shorter than the diameter of the outer peripheral surface of the first bearing portion 43A. Due to the protruding length of each of the first claw portion 51*a* and the second claw portion 62*a* falling within this range, increase in size of the holding structure 5 can be suppressed, and consequently, the thermal printer 1 can be reduced in size.

The base member 60 in this embodiment is provided with the holding hole portion 61 extending through the base member 60 in the axial direction D3. The platen roller 40 includes: the first end portion 40*a* supported by the first holding portion 51 and the second holding portion 62; and the second end portion 40*b* located on the side opposite to the first end portion 40*a* in the axial direction. The platen roller 40 is supported on the inner peripheral surface of the holding hole portion 61 via the second bearing portion 43B at the second end portion 40*b*.

According to this embodiment, it is possible to stably hold both the end portions 40*a* and 40*b* of the platen roller 40. Further, the base member 60 is assembled to the cover main body 50 under a state in which the second end portion 40*b* is inserted into the holding hole portion 61, and hence, the first end portion 40*a* of the platen roller 40 can be easily held between the first holding portion 51 and the second holding portion 62. Accordingly, an assembling process of the cover 3 can be simplified.

An embodiment of the present invention has been described above, but each of the configurations, a combination thereof, and the like in the embodiment are merely examples, and addition, omission, replacement, and other changes in the configurations are possible within a range not departing from the gist of the present invention. Further, the present invention is not limited to the embodiment.

For example, in the above-mentioned embodiment, the case has been described in which the first claw portion 51*a* and the second claw portion 62*a* have the inclined surfaces, respectively, and the inclined surfaces face each other not only in the first direction D1 but also in the axial direction D3. However, the first claw portion 51*a* and the second claw portion 62*a* may be configured to each have no inclined surface, and to have respective tip end surfaces extending in the axial direction D3 and facing each other only in the first direction D1.

What is claimed is:

1. A thermal printer, comprising:
a housing including a roll sheet receiving portion;
a cover which is pivotably attached to the housing, and is configured to open and close the roll sheet receiving portion;
a platen roller which is rotatably supported on the cover via a bearing portion; and
a thermal head which is to be brought into press contact with an outer peripheral surface of the platen roller,
wherein the cover includes a cover main body and a base member which is fixed to the cover main body,
wherein directions orthogonal to an axial direction of the platen roller and also orthogonal to each other are defined as a first direction and a second direction, respectively,
wherein the cover main body includes a first holding portion which supports the bearing portion from one side in the first direction,
wherein the base member includes a second holding portion which supports the bearing portion from the other side in the first direction,
wherein the first holding portion is located on one side in a second direction with respect to the bearing portion, and includes a first claw portion protruding to the other side in the first direction along an outer peripheral surface of the bearing portion,
wherein the second holding portion is located on the one side in the second direction with respect to the bearing portion, and includes a second claw portion protruding to the one side in the first direction along the outer peripheral surface of the bearing portion, and
wherein the first claw portion and the second claw portion face each other in the first direction.

2. The thermal printer according to claim 1,
wherein the first claw portion and the second claw portion each have a width dimension which is reduced in going toward a tip end side of each of the first claw portion and the second claw portion,
wherein the first claw portion includes a first inclined surface which is inclined to one side in the axial direction in going toward the tip end side of the first claw portion,
wherein the second claw portion includes a second inclined surface which is inclined to the other side in the axial direction in going toward the tip end side of the second claw portion, and
wherein the first inclined surface and the second inclined surface face each other in the axial direction and the first direction.

3. The thermal printer according to claim 2,
wherein a sheet discharge port is provided between the housing and the cover, and
wherein the first inclined surface and the second inclined surface are each inclined toward an end portion side of the platen roller in going away from the sheet discharge port.

4. The thermal printer according to claim 2, wherein a chamfered surface is provided at a tip end of each of the first claw portion and the second claw portion.

5. The thermal printer according to claim 1, wherein a protruding length of each of the first claw portion and the second claw portion is equal to or longer than a radius of the outer peripheral surface of the bearing portion.

6. The thermal printer according to claim 1, wherein a holding hole portion is provided in the base member, and extends through the base member in the axial direction, wherein the platen roller includes:

a first end portion which is supported by the first holding portion and the second holding portion; and a second end portion which is located on a side opposite to the first end portion in the axial direction, and wherein the platen roller is supported on an inner peripheral surface of the holding hole portion via a bearing portion at the second end portion.

* * * * *